(12) United States Patent
Jeffers

(10) Patent No.: US 9,685,094 B2
(45) Date of Patent: Jun. 20, 2017

(54) TEXT TO TRAINING AID CONVERSION SYSTEM AND SERVICE

(75) Inventor: Tammy V. Jeffers, Ellicott City, MD (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 2364 days.

(21) Appl. No.: 11/861,357

(22) Filed: Sep. 26, 2007

(65) Prior Publication Data

US 2009/0081630 A1 Mar. 26, 2009

(51) Int. Cl.
*G09B 7/00* (2006.01)
*G09B 5/06* (2006.01)

(52) U.S. Cl.
CPC ...................... *G09B 5/06* (2013.01)

(58) Field of Classification Search
CPC ........................................ G09B 7/00
USPC .................. 434/362; 382/305, 209
See application file for complete search history.

(56) References Cited

U.S. PATENT DOCUMENTS

| | | | |
|---|---|---|---|
| 4,996,707 A * | 2/1991 | O'Malley et al. | 379/100.13 |
| 5,715,370 A * | 2/1998 | Luther et al. | 704/270.1 |
| 6,018,710 A * | 1/2000 | Wynblatt et al. | 704/260 |
| 6,052,663 A * | 4/2000 | Kurzweil et al. | 704/260 |
| 6,115,482 A * | 9/2000 | Sears et al. | 382/114 |
| 6,185,329 B1 * | 2/2001 | Zhang et al. | 382/176 |
| 6,917,438 B1 * | 7/2005 | Yoda et al. | 358/1.15 |
| 7,239,747 B2 * | 7/2007 | Bresler et al. | 382/176 |
| 7,391,527 B2 * | 6/2008 | Irwin et al. | 358/1.15 |
| 7,675,641 B2 * | 3/2010 | Cui et al. | 358/1.15 |
| 7,882,434 B2 * | 2/2011 | Slotznick et al. | 715/710 |
| 2001/0056342 A1 * | 12/2001 | Piehn et al. | 704/3 |
| 2003/0059088 A1 * | 3/2003 | Culp et al. | 382/104 |
| 2003/0128875 A1 * | 7/2003 | Pilu et al. | 382/177 |
| 2003/0152293 A1 * | 8/2003 | Bresler et al. | 382/305 |
| 2003/0171926 A1 * | 9/2003 | Suresh et al. | 704/270.1 |
| 2004/0088165 A1 * | 5/2004 | Okutani et al. | 704/260 |
| 2005/0197825 A1 * | 9/2005 | Hagerman et al. | 704/2 |
| 2005/0205671 A1 * | 9/2005 | Gelsomini et al. | 235/384 |
| 2006/0015342 A1 * | 1/2006 | Kurzweil et al. | 704/260 |
| 2006/0029296 A1 * | 2/2006 | King et al. | 382/313 |
| 2006/0041590 A1 * | 2/2006 | King et al. | 707/104.1 |
| 2006/0092480 A1 * | 5/2006 | Cui et al. | 358/474 |

\* cited by examiner

*Primary Examiner* — Andrew Iwamaye
*Assistant Examiner* — Alvin Carlos

(57) ABSTRACT

A method and system of an embodiment may include receiving an image of printed material from a device associated with a user, receiving a request from the user to generate a training aid utilizing the printed material, generating the training aid utilizing the printed material; and providing access to the training aid to the user, wherein providing access includes one of transmitting the training aid to a device associated with the user or providing notification regarding access to the training aid to a device associated with the user.

21 Claims, 3 Drawing Sheets

TEXT TO TRAINING AID CONVERSION SYSTEM AND SERVICE

BACKGROUND INFORMATION

People have wide range of educational or work related materials presented to them which are not available in a digital format or in a meaningful format. Material available only in printed format may be burdensome in size and is less convenient to transport. Printed material does not allow for easy sharing, formatting, organization, searching and memorization of material. The content of printed material on whiteboards, chalkboards, bulletin boards, display screens and other locations may be lost to a person if they do not take the time and effort to transcribe the information.

BRIEF DESCRIPTION OF THE DRAWINGS

In order to facilitate a fuller understanding of the exemplary embodiments of the present disclosure, reference is now made to the appended drawings. These drawings should not be construed as limiting, but are intended to be exemplary only.

DETAILED DESCRIPTION OF PREFERRED EMBODIMENTS

An exemplary embodiment of the present disclosure provides a text to training aid conversion system and service to one or more clients. The text to training aid conversion system and service may enable a user to convert textual material into a digital format more conducive to learning and easier to transport, format, share and access.

Figure 1:
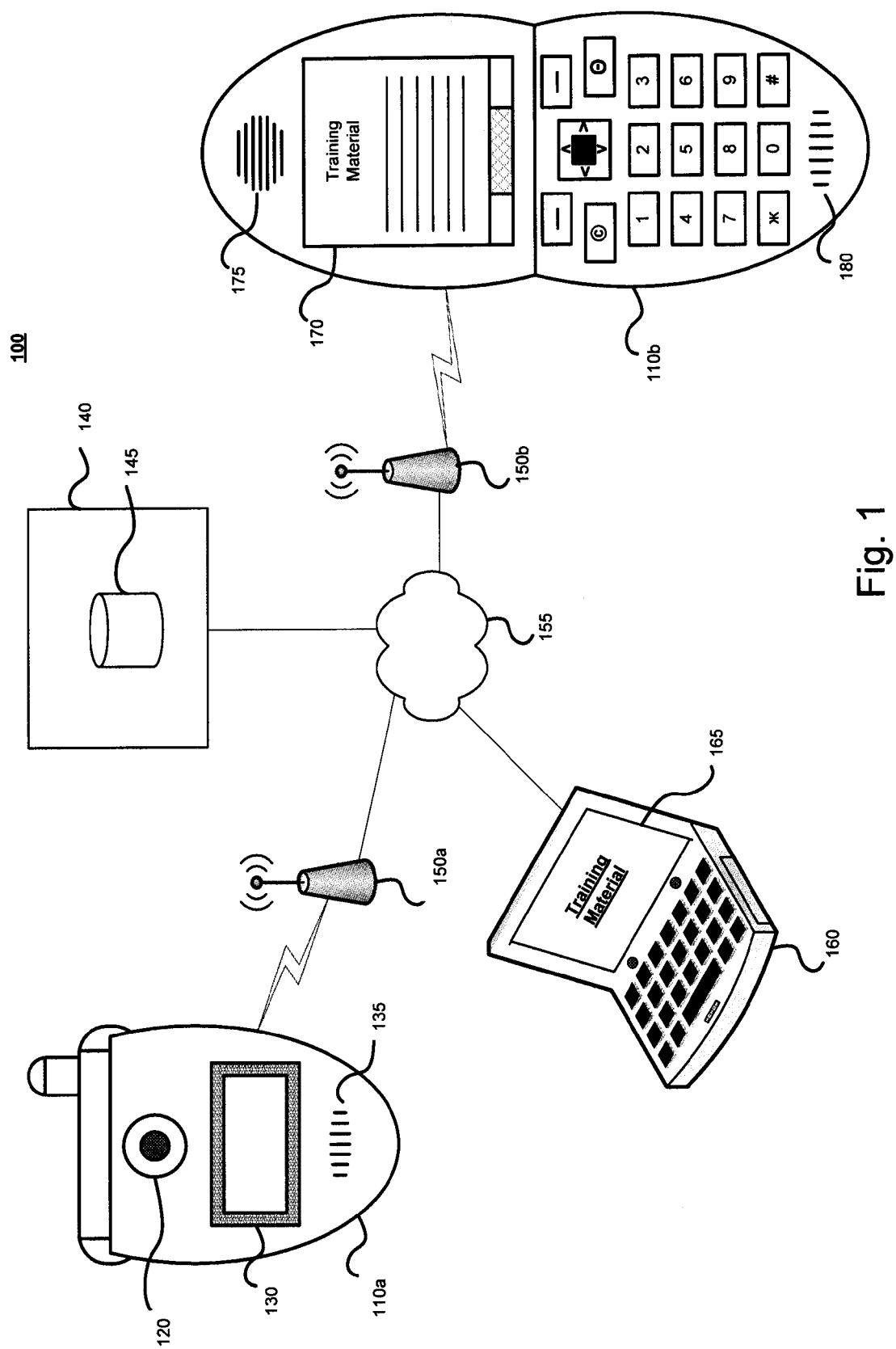
FIG. 1 is a text to training aid conversion system and service, in accordance with an exemplary embodiment.

Referring to FIG. 1, a text to training aid conversion system and service, in accordance with an exemplary embodiment is illustrated. System 100 illustrates an exemplary system for supporting a text to training aid conversion system and service. It is noted that system 100 is a simplified view of a network and may include additional elements that are not depicted. As illustrated, text to training aid conversion device 110a may contain a digital camera 120, a display screen 130 and a speaker 135. Text to training aid conversion device 110a may be operatively connected to network 155 via wireless access point 150a. The network 155 may contain one or more network elements 140. A network element 140 may contain or be operatively connected to training material database 145. Text to training aid conversion device 110b may represent a view of text to training aid conversion device 110a when the device is opened. Text to training aid conversion device 110b may be operatively connected to network 155 via wireless access point 150b. Text to training aid conversion device 110b may contain display 170, speaker 175 and microphone 180. A computer 160 may be, but is not limited to, a laptop computer, desktop computer, personal digital assistant (PDA), an electronic book reader or other computer containing display screen 165. The computer 160 may be operatively connected to the network 155. The network 155 may contain one or more network enabled devices capable of obtaining images of printed material, receiving images of printed material, processing images of printed material, transmitting images of printed material, transmitting or receiving processed printed material data and/or performing other functionalities related to utilizing images or data received from images of printed material.

One or more devices coupled to network 155 may be text to training aid conversion devices 110a and 110b. Text to training aid conversion devices 110a and 110b may be wireline phones, cellular phones, mobile phones, or satellite phones, Personal Digital Assistants (PDA), computers, handheld MP3 players, personal media players, gaming devices, digital video recorders, electronic book readers, set top boxes or other devices capable of capturing an image of training material. Text to training aid conversion devices 110a and 110b may allow a user to capture digital images of printed material. Text to training aid conversion device 110a may provide confirmation of an image acquisition via display screen 130. Display screen 130 may show an image of captured text and may provide messages confirming the capture, displaying an error, prompting with options or providing other information. Speakers 135 and 175 may provide indicators, such as, but not limited to, tones, recorded messages, generated speech or other audible alerts confirming the capture of images, providing prompts or other information.

Once an image is captured a user may be prompted with various options or the user may select various options from a menu on display 130, display 165 or display 170. A user may use a keypad or provide spoken commands to navigate prompts provided by text to training aid conversion devices 110a and 110b. The spoken commands provided by a user may be interpreted using voice recognition technology. Options may allow a user to provide digital image manipulation including adjusting brightness, adjusting contrast, magnifying or reducing an image size, cropping an image, rotating an image or providing other digital image manipulation. Options may also enable a user to transmit an image, associate an image with stored text, provide a textual description of an image, record a memo associated with an image, perform optical character recognition on an image, categorize and index or perform other image processing options.

Text to training aid conversion devices 110a and 110b may transmit and/or receive data to and/or from network 155 representing training information. The training information may be transmitted and/or received utilizing a standard telecommunications protocol or a standard networking protocol. For example, one embodiment may utilize Session Initiation Protocol (SIP). In other embodiments, the training information may be transmitted and/or received utilizing other Voice Over IP (VOIP) protocols. For example, training information may also be transmitted and/or received using Wireless Access Protocol (WAP), Multimedia Messaging Service (MMS), Enhanced Messaging Service (EMS), Short Message Service (SMS), Global System for Mobile Communications (GSM), other Transmission Control Protocol/Internet (TCP/IP) Protocols, or other protocols suitable for transmitting and receiving training related data. Training related data may be transmitted and/or received wirelessly or may utilize cabled network or telecom connections such as an Ethernet RJ45/Category 5 Ethernet connection, a fiber connection, a traditional phone wireline connection, a cable connection or other wired network connection. Text to training aid conversion devices 110a and 110b may use standard wireless protocols including IEEE 802.11a, 802.11b and 802.11g. Text to training aid conversion devices 110*a* and 110*b* may also be connected to network 155 via protocols for a wired connection, such as an IEEE Ethernet 802.3.

Text to training aid conversion devices 110*a* and 110*b* may receive images of printed material or training material via a mobile phone camera, a digital camera, a web page, an email, a Wireless Access Protocol transmission, Multimedia Messaging Service transmission, Enhanced Messaging Service transmission, a Short Message Service transmission; a Bluetooth transmission, an electronic storage medium, or other interfaces capable of transmitting digital training information.

Printed material may include text, images, diagrams, or other printed information. Printed material may be contained in books, magazines, posters, printouts, whiteboards, chalkboards, display screens, video monitors or other visual display devices. For example, a user may take a picture of training material on a class whiteboard using a digital camera or camera phone. A user may also upload an image of material using a digital file provided on an electronic storage media such as a memory stick, CD, DVD, or other electronic storage medium.

Network 155 may be a local area network (LAN), a wide area network (WAN), the Internet, cellular networks, satellite networks or other networks that permit that transfer and/or reception of data to and/or from text to training aid conversion devices 110*a* and 110*b*. Network 155 may utilize one or more protocols of text to training aid conversion device 110*a* or 110*b*. Network 155 may translate to or from other protocols to one or more protocols of text to training aid conversion device 110*a* or 110*b*. Training material transmitted through network 155 may be received by network element 140.

Network element 140 may be one or more servers (or server-like devices), such as a Session Initiation Protocol (SIP) server. Network element 140 may include one or more processors (not shown) for recording, transmitting, receiving, and or storing data. Although network element 140 is depicted as one server, it should be appreciated that the contents of network element 140 may be combined into fewer or greater numbers of servers (or server-like devices) and may be connected to one or more data storage systems. For example, network element 140 may be connected to one or more training material databases 145. Furthermore, the server may be local, remote, or a combination thereof to training material databases 145. Additionally, portions of network element 140 functionality may be implemented on text to training aid conversion device 110*a* or 110*b*.

Training material database 145 may be utilized by network element 140 to store training materials, language translation data and/or program code, game generation program code and/or data, grammatical information, reference information, pronunciation information, user information, subscription information, authentication information, licensing information and other data. Network element 140 may query training material database 145 to provide data in response to a request from text to training aid conversion device 110*a*, 110*b*, computer 160 or other device operative connected to network 155. Network element 140 may also query or store data on training material database 145 in order to provide one or more services to text to training aid conversion device 110*a*, 110*b*, computer 160 or other devices operative connected to network 155. Training material database 145 may be a component of network element 140 or training material database 145 may be operatively connected to network element 140.

Network element 140 may provide application programming interfaces (APIs), interface tables, remote procedure calls (rpcs), web services, Extensible Markup Language (XML) based interfaces, Simple Object Access Protocol (SOAP) based interfaces and other interfaces for sending or receiving training information. Network element 140 may receive data from text to training aid conversion device 110*a*, 110*b*, computer 160 or other devices operatively connected to network 155.

Network element 140 may provide services for text to training aid conversion device 110*a*, 110*b*, computer 160 and other devices operatively connected to network 155. Network element 140 may receive training data from text to training aid conversion devices 110*a* or 110*b*, computer 160 or other devices operatively connected to network 155. Network element 140 may provide formatting, editing, training material generation, sharing of training material, parsing of training material, indexing of training material, other transformation of training related data and other services. For example, services of network element 140 may include: performing optical character recognition on one or more portions of training data; generating a game presenting at least in part the training material to the user; generating an audio file based at least in part on the training material; converting at least a portion of the training material to one or more languages; providing a definition for one or more portions of the training material; providing synonyms for one or more portions of training material; providing pronunciation information for one or more portions of the training material; generating reference information related to one or more portions of the training material; generating an outline related to one or more portions of the training material; generating a quiz related to one or more portions of the training material; and generating grammatical information related to one or more portions of the training material. In some embodiments, generating training material may include producing a textual version of an audio file of a user by using speech recognition processing. For example, a user may record a lecture using a digital recorder and the audio file may be sent to network element 140 for processing. A user may receive one or more training aids generated from the audio file by network element 140, including but not limited to, outlines or notes generated using speech recognition processing. The user may be presented with options for further processing enabling them to produce a game, or other aid based on content from the audio file.

Transforming training related data may include categorizing training materials by type, theme, location, cost, rating, preference of one or more text to training aid conversion devices 110*a* or 110*b*, or other category. Some training information may be provided on a subscription or other cost basis. Some training information may be sponsored by an advertiser, a promoter or other sponsor. Textual material may be transformed into training aids.

Training aids may include, but are not limited to games, flashcards, meeting notes, course outlines, class notes, language translations, text to speech audio files, lab notes, slide presentations, electronic books, research materials, other digital representations of images received by a text to training aid device, and video or audio captured by a device of a user. Training aids may be printed on printers, played over speakers or headphones, played on video display devices or otherwise output. Outputs available may depends on formats or options chosen by a user of a text to training aid conversion system or device.

In one or more embodiments, network element 140 may query one or more external sources of information to gather training information or facilitate training transactions. For example, network element 140 may gather information from a search engine or from a user specified web site. Additionally, network element 140 may access other sources of information to access reference data or educational material or services.

In one or more embodiments, text to training aid conversion device 110a, 110b, computer 160 or other devices accessible to a user of a text to training material service may perform one or more portions of the training material transformation. For example, a user of text to training aid conversion device 110a utilize camera 120 to take one or more pictures of reading material for a school assignment. The user may view a confirmation message, the image or other information on display screen 130. The user may specify that they wish to generate a training aid from the one or more pictures. The user may be prompted to select the type of training aid from a menu or via audio prompts. For example, a user may specify that they would like a mnemonic aid, such as a game, generated using one or more portions of the training material. The user may specify a favorite game, such as hangman, crossword, matching, flash cards, quizzes, word find, spelling games or other games. Text to training aid conversion device 110a may perform optical character recognition (OCR) on one or more images. Text to training aid conversion device 110a may also allow a user to edit the images or the text obtained for OCR'd images in order to specify key words, identify training material of interest, label training material, or provide other input. Game or other training aid generation may be performed on text to training aid conversion device 110a, network element 140 or other devices accessible to a user of a text to training material service. The user may specify options for the game which may include: scoring, sharing of the game, multiple player mode enabled, timed mode enabled, hints enabled, translation of the game, and other game options. Portions of the training aid generation may be performed by different devices accessible to network 155.

Once a training aid has been generated it may be accessible to one or more users of network 155. The training aid may be presented via a web-based interface, a text message based interface, a television based interface, a phone interface, a printer, a handheld MP3 player, a gaming device, a computer generated speech menu, a recorded menu, an email based interface or other interfaces capable of presenting the training aid to the user. In one or more embodiments, the training aid may be available for electronic download or may be transmitted to the user and a user may use the training aid on a device of their choice.

As an example, a user of a text to training aid device or system may be an instructor of a class who may provide training material using computer 160. The training material may be converted into a game by network element 140. The training format chosen by the instructor may be an interactive multiple player spelling bee which may enable users to test their spelling against other members of the class. A user may also specify a quiz format which may enable multiple users to compete in subjects such as geography, history, languages or other subjects. An instructor may provide video, audio, text or other educational materials to be reviewed before or after class members use the training aid. An instructor may record a voice memo using a mobile phone which may provide hints, instructions or guidance related to the training aid. The instructor may then take digital pictures of the training material and provide the training material for conversion into a game. The pictures may be transformed into text using optical character recognition. The instructor may then highlight or specify key words or portions of the text to be used in game generation. An instructor may also opt not to OCR pictures and may enter labels corresponding to the pictures. The labels may be used to generate a matching game, a flashcard game or other training game which may provide a more suitable game format to memorize biology slides, molecular structures, architecture or other subjects. Once the preparation of the game or other training materials is complete, the instructor may specify one or more users or groups of users to receive access to the training aid. The instructor may send a notification containing the training aid, a link to the training aid or information about the training aid to one or more users or groups of users. The notification or the access may be provided via a website, an email, an electronic message, a voice mail or other electronic alert.

In one or more embodiments, training material usage may be tracked. Network element 140 may track training aid usage and participation. Network element 140 may receive information related to the user's use of the game and may generate a score, rankings, a grade, a completion percentage, awards, credit, or other game related statistics. Usage and participation may be tracked by text to training aid conversion device 110a, 110b, computer 160 or other devices operatively connected to network 155. Usage and participation information may be accessible to a provider of educational material, a host of educational material, a user of educational material and other users. Levels of access may be specified. For example, an instructor may receive detailed information about how their students did on an online quiz. The information may include: time to complete, time per question, questions correct, questions incorrect, answers chosen, class rank, grade and other information. The instructor may set the training aid to provide none of the information or one or more portions of information with the student. Additionally, the instructor may specify that one or more portions of the information, such as the class rank, are accessible to the entire class. An instructor or other user may also limit the information to listing top performers either by specifying a percentage that may be displayed or a number of users of the training aid. Statistics may be used to generate rewards to top performers or to provide other incentives.

In one or more embodiments, a text to training aid conversion may allow an employee to provide a training aid or meeting notes to other employees, contractors, customers or business associates. For example, an employee of a company may record a video segment using a phone or a voice memo using a phone which may provide instruction on equipment or merchandise provided by the company. The employee may also scan training materials using a digital camera and may generate a training aid or a test using one or more portions of the training materials. The company may be able to track an employee's use of the training materials, the employee's score on a test and other training aid statistics. A user of the training materials may receive a certification from the company upon successful completion of a test. This may enable a company to ensure compliance with corporate policy, a regulation or other goals.

In another example, articles or other printed material may be scanned by a user of text to training aid conversion device 110a, 110b, computer 160 or other devices operatively connected to network 155 for conversion into an audio file. This may enable a user to listen to an audio file as a podcast or as streaming audio during commuting or other time when reading textual material may not be feasible. A user may also be able to utilize quizzes, games, flashcards or other training aids related to the audio file. The games, flashcards and other mnemonic training aids may be more appealing to students. Additionally, training materials accessible digitally may be available via web-based interfaces, a text message based interfaces, a television based interfaces, phone interfaces, MP3 players, gaming devices, an email based interfaces or other portable interfaces. This may allow a user more flexibility in learning the material and ensure greater access to the material. For example, after listening to a podcast containing a lesson, a student may be able to send a text message request for an interactive quiz. The interactive quiz may send text messages containing questions related to the material and may receive text message answers from the student. The interactive quiz may accept commands to provide hints, scoring, answers, set a level of difficulty, set a response timeout period, focus on a portion or sub-category of the training material or other commands. Hints, answers, scores, and other information may be provided to a user via text message, email, web pages or other options. In addition to interactive quizzes, users may download games or other study aids to their personal devices. Downloaded games or other training aids may be accessible when a device is not currently connected to a network.

A user of text to training aid conversion device 110a or 110b may be able to scan maps, menus or other information while traveling. This may enable the user to request translation from a foreign language to their preferred language while traveling. For example, a user may take a picture of menu at a restaurant and may request and receive a translation of one or more portions of the menu. Additionally, a user may be able to enter key words or phrases and receive a translation. The translation may be provided on the screen of text to training aid conversion device 110a or 110b. The translation may also be provided as an audio file or streaming audio to enable a user to learn the pronunciation of a word or phrase. The user may be able to save key words and images and their translations for generation into a training aid.

In yet another embodiment a text to training aid conversion device 110a or 110b may be a set top box or a digital video recorder or a text to training aid conversion device 110a or 110b may interface with a set top box or a digital video recorder or other video or broadcast control device. For example, a user may transmit an image of training material to a set top box which may then process the image or transmit the image to a server on a network of a service provider to be processed. The user may then be presented with an offering of related video or broadcasts or they may be prompted with other options on a video display associated with the set top box. In some embodiments, a user may use a remote control or other interface to a set top box or digital video recorder to perform a screen capture or video grab of material presented on an associated display. The material may be transmitted to a service provider or server of a service provider for further processing or may be processed by the set top box or digital video recorder. The processed material may allow a service provider to present related offerings. The processed material may allow a user to generate a training aid using one or more portions of the material. Network element 140 may represent a server of a service provider and a user may be able to store one or more portions of the processed material on network element 140 or in training material database 145.

The various components of system 100 as shown in FIG. 1 may be further duplicated, combined and/or integrated to support various applications and platforms. Additional elements may also be implemented in the systems described above to support various applications.

Figure 2:
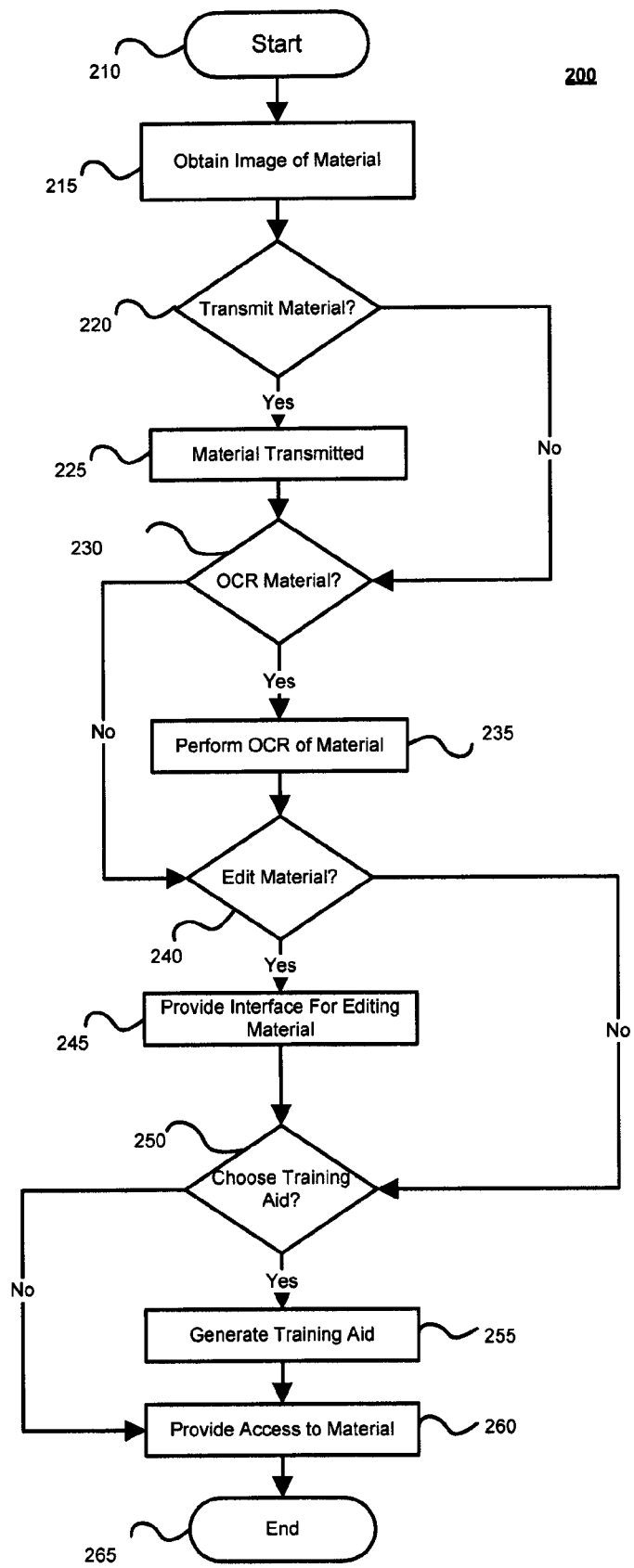
FIG. 2 is depicts a method for implementing a text to training aid conversion system and service, in accordance with an exemplary embodiment.

Referring to FIG. 2, a method 200 for implementing a text to training aid conversion system and service is illustrated, in accordance with an exemplary embodiment. This exemplary method 200 is provided by way of example, as there are a variety of ways to carry out the method. The method 200 shown in FIG. 2 can be executed or otherwise performed by one or a combination of various systems. The method 200 is described below may be carried out by the text to training aid conversion system 100 shown in FIGS. 1 and 3 by way of example, and various elements of the detection system 100 are referenced in explaining the example method of FIG. 2. Each block shown in FIG. 2 represents one or more processes, methods or subroutines carried out in exemplary method 200. Referring to FIG. 2, exemplary method 200 may begin at block 210.

At block 215, an image of printed material may be obtained. A user may provide an image or may select from stored images. Images may be acquired by a text to training aid conversion device 110a or 110b. Additionally a user may select from images that may be stored on text to training aid conversion device 110a or 110b, network element 140 or training material database 145. Method 200 may continue at block 220.

At block 220, the user may decide whether to transmit the digital image. According to one or more embodiments, a network element of a service provider may perform one or more steps of transforming a digital image into a training aid. In one or more embodiments, a user may perform one or more steps of transforming the digital image into a training aid on a device of the user, such as a mobile phone. If a user decides to transmit the training material the method 200 may continue at block 225. If the user decides not to transmit the training material, the method 200 may continue at block 230.

At block 225, the training material may be transmitted from a device of a user, such as, but not limited to, text to training aid conversion device 110a or 110b, to a network enabled device including but not limited to network element 140. The network enabled device may be a server of a service provider, a server of a user's employer, or another network enabled device. The network enabled device may facilitate the transformation of the digital image into a training aid, facilitate the access or sharing of the training material, provide storage for the training material or provide other processing services. The network enabled device may also be a computer of a user, which may allow a user to capture an image on a digital camera or mobile phone and to continue processing the image into a training aid on a computer. The further processing may be performed on the computer or may be performed at least in part by a remote computer, such as a server of a service provider. Method 200 may continue at block 230.

At block 230, users of the method may decide whether to perform optical character recognition (OCR) on the digital image. A user may opt to perform OCR processing on all or a specified portion of an image. For example, a user may select a portion of an image representing key training concepts to be incorporated into a training aid. For other training aids, such as slides, diagrams, charts, or photographs, a user may opt not to perform OCR processing. If a user decides not to perform OCR processing, the method may continue at block 240. If a user decides to perform OCR processing the method may continue at block 235.

At block 235 Optical Character Recognition (OCR) processing may be performed. Optical Character Recognition may be performed by a process running on a user device, including but not limited to text to training aid conversion device 110a or 110b, or a network enabled device, including but not limited to, network element 140, or another device operatively connected to the user device. For example, a user's mobile phone may perform OCR processing on images of training material. In other embodiments, a network element, such as a server of a service provider or an employer, may provide OCR processing. OCR processing may enable the resultant text to be edited, formatted, converted to an audio file or streaming audio via text to speech synthesis or processed further. In another embodiment, a set top box may perform OCR processing or may transmit the training material to a network enabled device operatively connected to the set top box for OCR processing. Method 200 may continue at block 240.

At block 240, a user may be prompted to decide whether to edit the material. If the user decides to edit the material the method may continue at block 245. If the user decides not to edit the material, the process may continue at step 250.

At block 245, an editing interface may be provided for a user to edit the training material. The editing interface may be a text processor which may enable formatting and editing of training material. The editing interface may enable graphics editing for digital images and video files provided by a user. The editing interface may enable a user to select certain portions for further processing, such as conversion of key words or concepts into a game, flash cards, an outline, slides, an audio file, a podcast or other training materials. The editing interface may enable one or more portions of the material to be tagged, categorized, indexed or otherwise sorted.

At block 250, a user may be prompted to choose a training aid. If the user chooses to generate a training aid the method may continue at block 255. If the user chooses not to generate a training aid, the method may continue at block 260.

At block 255, a user may be presented with a training aid generation interface offering further choices related to the generation of the training aid. The user may be offered a choice of generation of flashcards, meeting notes, course outlines, class notes, language translations, text to speech audio files, lab notes, slide presentations, research material and other training aids which may relate to one or more portions of the training material. The generation of a training aid may include: generating a game presenting at least in part the training material to the user; generating an audio file based at least in part on the training material; converting at least a portion of the training material to one or more languages; providing a definition for one or more portions of the training material; providing synonyms for one or more portions of training material; providing pronunciation information for one or more portions of the training material; generating reference information related to one or more portions of the training material; generating an outline related to one or more portions of the training material; generating a quiz related to one or more portions of the training material; and generating grammatical information related to one or more portions of the training material or other formatting, editing, translation or processing of printed material which produces one or more products which may enable a user to more easily or more enjoyably share, format, organize, search, transport and/or memorize the material. A user may be prompted to enter further information to generate the training aid. The prompts may be based upon the type of training aid selected. For example, a user may be prompted to enter: key words to incorporate into a game of hangman; key terms and their corresponding definitions to incorporate into a crossword puzzle; words and their corresponding translations to incorporate into a matching game; key terms to be used to search for related references; or other input related to the content, format or generation of the training aid.

The training aid generation interface may further enable a user to search for and receive information about reference materials, such as suggested web links, video programs, books, articles, broadcasts or other resources related to one or more subjects contained in the training material. The training aid generation interface may allow a user to request dictionary definitions, synonyms, antonyms, conjugations, usage and other linguistic information related to one or more key terms identified by a user. The training aid generation method may query a local database or access resources on a network to provide the requested information for the training aid. Key terms identified by users may tracked to offer products and services and other advertising to the users. For example, a user generating a training aid on a particular subject may be sent emails, messages, or other notifications about video on demand or other broadcast offerings on the subject. Method 200 may continue at block 260.

At block 260, one or more users may be provided access to the training material. If a training aid was chosen at block 250, access to the training aid will be provided. If a training aid was not chosen at block 250, the user generating the training aid may view the training material, save the training material, transmit the training material or choose to generate a training aid later. If a training aid was generated, the training aid may be presented via a web-based interface, a text message based interface, a television based interface, a phone interface, a printer, a handheld MP3 player, a gaming device, a computer generated speech menu, a recorded menu, an email based interface or other interfaces capable of presenting the training aid to the user. In one or more embodiments, the training aid may be available for electronic download or may be transmitted to one or more users and the one or more users may use the training aid on a device of their choice.

Figure 3:
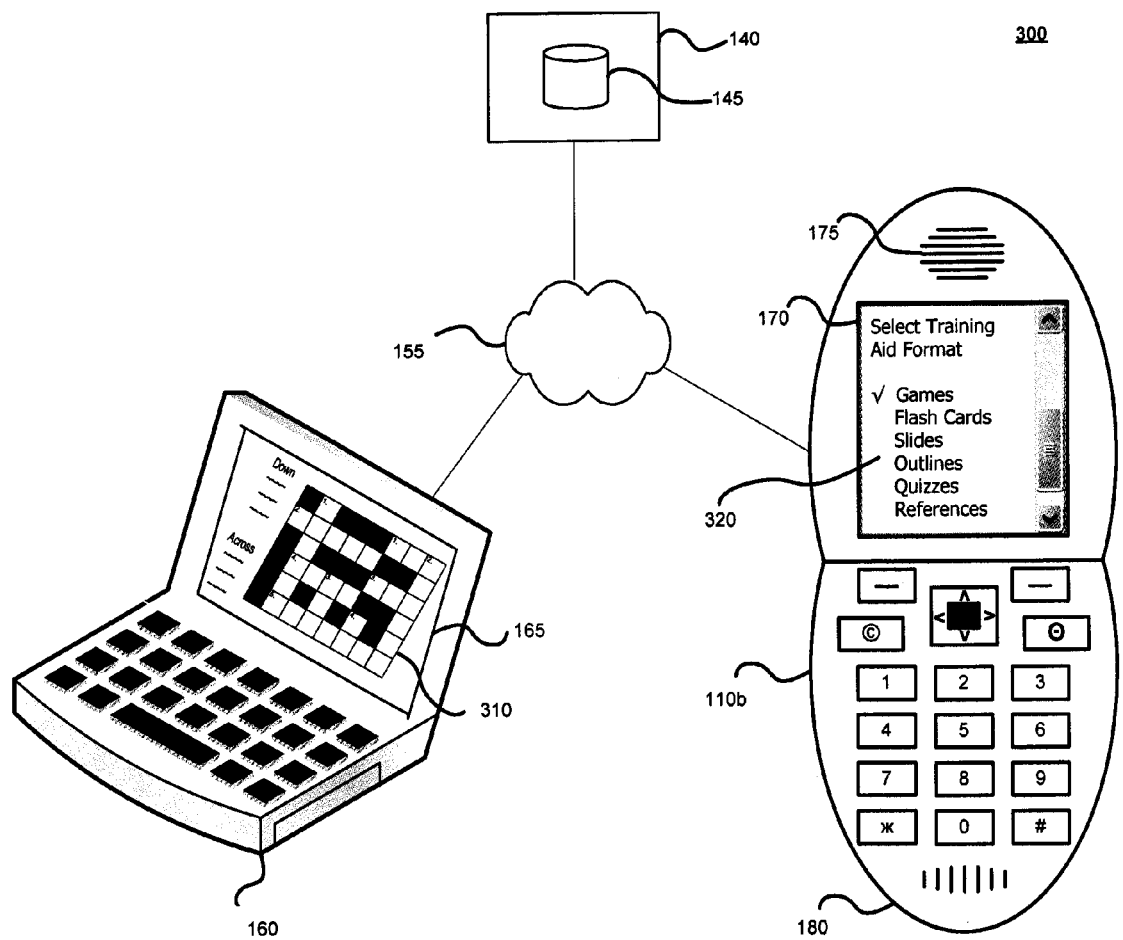
FIG. 3 is a text to training aid conversion system and service, in accordance with an exemplary embodiment.

Referring to FIG. 3, a text to training aid conversion system and service, in accordance with an exemplary embodiment is illustrated. System 300 illustrates an exemplary system for supporting a text to training aid conversion system and service. It is noted that system 300 is a simplified view of a network and may include additional elements that are not depicted. As illustrated, text to training aid conversion device 110b may be operatively connected to network 155 via wireless access point 150b. Text to training aid conversion device 110b may contain display 170, speaker 175 and microphone 180. Computer 160 may be a laptop computer or other computer containing display screen 165. Computer 160 may be operatively connected to network 155.

A user of text to training aid conversion device 110b may capture an image of training material using a digital camera (not shown). The user may be prompted via menus, such as menu 320, with training aid generation and formatting options. The options may be provided by software residing on text to training aid conversion device 110b or they may be received from network element 140. The options may be presented as a text message, an email message, a web page, a recorded audio message, a generated audio message or in other formats receivable by text to training aid conversion device 110b. Menu 320 may provide a user with options for training aid generation, such as games, flash cards, slides, outlines, quizzes, references and other options. A user may select the options using a keypad or other control of text to training aid conversion device 110b to scroll up or down to the desired entry, to enter the label of the desired entry, to type the number of the desired entry, or to input another indicator for the desired entry. In one or more embodiments, a user may also speak the name, number or other indicator of the desired entry and the command may be received by microphone 180 and processed by text to training aid conversion device 110*b* using speech recognition. Menu 320 may indicate a selected entry by placing a checkmark by the specified entry, highlighting the specified entry or providing other visual or audible indicators. Text to training aid conversion device 110*b* may provide an audible confirmation of a selection via speaker 175. In one or more embodiments, once a user has taken an image of training material one or more training aids may be automatically generated. The training aids may then be offered to the user. Training aids may be available on text to training aid conversion device 110*b*, computer 160 or other devices capable of displaying, playing or presenting the training aid. In some embodiments, training aids may be printed.

Computer 160 may contain display 165 which may present or generate one or more training aids. Training aid 310 is an exemplary game format training aid. Training aid 310 may represent a crossword puzzle generated from a digital image of training material. It may enable a user to learn key concepts, vocabulary words and other aspects of a particular set of training material. The crossword puzzle may provide a fun way for a student to memorize aspects of an instructor's lesson and may increase study time, enhance comprehension and improve memorization of the training material. Training aid 310 may be stored in training material database 145. Training aid 310 may be generated by network element 140 from material stored in training material database 145, generated by network element 140 from data or images received from text to training aid conversion device 110*b* or computer 160 or other devices accessible via network 155. Training aid 310 may be generated and/or stored by computer 160 or text to training aid conversion device 110*b*. Training aids generated or stored by one device may be accessible to one or more other devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
 receiving, by a network device via a wireless network, an image of printed material from a wireless device associated with a user;
 transmitting, by the network device, a prompt to a enable the user to select a training aid to be generated from the image of the printed material,
  the training aid being selected from a group of available training aids;
 receiving, by the network device via the wireless network, a request from the user to generate the training aid utilizing the image of the printed material;
 receiving, by the network device, a user edit to a text of the image of the printed material,
  the user edit being received after the image of the printed material is received from the wireless device;
 generating, by the network device, the training aid from the image of the printed material,
  the training aid being generated based on the user a selection of the training aid and the user edit; and
 providing, by the network device, access to the training aid to at least the user,
  providing the access including one of:
   transmitting the training aid to one or more devices associated with at least the user, or
   providing a notification regarding access to the training aid to one or more devices associated with at least the user.

2. The method of claim 1, wherein the image of the printed material is received via at least one of:
 a web page;
 an email;
 a Wireless Access Protocol transmission;
 Multimedia Messaging Service transmission;
 Enhanced Messaging Service transmission;
 a Short Message Service transmission;
 an RF transmission; or
 an electronic storage medium.

3. The method of claim 1, further comprising performing optical character recognition on the image of the printed material.

4. The method of claim 1, further comprising
 providing an interface to enable editing of the image of the printed material.

5. The method of claim 1, wherein the image of the printed material is selected from a group of stored images.

6. The method of claim 1, further comprising
 presenting the training aid to the user via an interface comprising at least one of:
 a web-based interface;
 a text message based interface;
 a television based interface;
 a phone interface;
 a printer;
 a handheld MP3 player;
 a gaming device;
 a computer generated speech menu;
 a recorded menu; or
 an email based interface.

7. The method of claim 1, wherein generating the training aid includes at least one of:
 generating a game presenting at least in part the printed material to the user;
 generating an audio file based at least in part on the printed material;
 converting at least a portion of the printed material to one or more languages;
 providing a definition for one or more portions of the printed material;
 providing synonyms for the one or more portions of the printed material;
 providing pronunciation information for the one or more portions of the printed material;
 generating reference information related to the one or more portions of the printed material;
 generating an outline related to the one or more portions of the printed material;
 generating a quiz related to the one or more portions of the printed material; or generating grammatical information related to the one or more portions of the printed material.

8. The method of claim 1, wherein the group of available training aids includes at least one of:
 images;
 flashcards;

meeting notes;
course outlines;
class notes;
language translations;
text to speech audio files;
lab notes;
slide presentations;
a game; or research materials.

9. The method of claim 1, wherein the training aid is a game, and wherein the method further comprises: receiving information related to a use of the game and generating at least one of:
   a score;
   rankings;
   a grade;
   a completion percentage;
   awards;
   credits; or
   game related statistics.

10. The method of claim 1, wherein the training aid is a game, and wherein the game allows for multiple players over a network.

11. The method of claim 1, further comprising: enabling sharing of the training aid with users of a network.

12. A system, comprising: a telecommunications device, associated with a user, comprising
   a memory storing instructions; and a processor to execute the instructions to:
   receive, from a network device and over a network, an image of printed material;
   prompt the user to select a training aid to be generated from the image of the printed material, the training aid being selected from a group of available training aids;
   receive a user request to edit the image of the printed material;
   edit, based on the user request, a text of the image of the printed material to produce an edited image;
   generate the training aid utilizing the edited image, the training aid being generated based on a selection of the training aid and the edited image; and present the training aid to the user.

13. The system of claim 12, wherein the telecommunications device comprises at least one of:
   a mobile phone;
   a personal digital assistant;
   a digital camera;
   a set top box;
   a DVD player;
   an electronic book reader;
   a digital video recorder;
   a gaming device; or
   a computer.

14. The system of claim 12, wherein the processor is further to: perform optical character recognition on the image of the printed material.

15. The system of claim 12, wherein the processor is further to provide an interface to enable editing of the printed material.

16. The system of claim 12, wherein the processor, when generating the training aid, is further to at least one of:
   generate a game presenting at least in part the printed material to the user;
   generate an audio file based at least in part on the printed material;
   convert at least a portion of the printed material to one or more languages;
   provide a definition for one or more portions of the printed material;
   provide synonyms for the one or more portions of the printed material;
   provide pronunciation information for the one or more portions of the printed material;
   generate reference information related to the one or more portions of the printed material;
   generate an outline related to the one or more portions of the printed material;
   generate a quiz related to the one or more portions of the printed material; or
   generate grammatical information related to the one or more portions of the printed material.

17. The system of claim 12, wherein the processor is further to at least one of:
   perform optical character recognition on the image of the printed material;
   format at least a portion of the image of the printed material;
   generate an audio file based at least in part on the image of the printed material;
   convert at least the portion of the image of the printed material to one or more languages;
   provide a definition for one or more portions of the image of the printed material;
   provide synonyms for the one or more portions of image of the printed material; or provide pronunciation information for the one or more portions of the image of the printed material.

18. The system of claim 12, wherein the processor is further to: process the image of the printed material; and at least one of:
   post one or more portions of the processed image to a website;
   email the one or more portions of the processed image;
   transmit an audio file containing the one or more portions of the processed image;
   transmit an electronic message containing the one or more portions of the processed image; or print the one or more portions of the processed image.

19. The system of claim 12, where the user request includes a request to edit a graphic of the image of the printed material; and where the telecommunications device is further configured to: edit, based on the user request, the graphic of the image of the printed material to produce the edited image.

20. A non-transitory computer-readable medium for storing instructions, the instructions comprising: one or more instructions that, when executed by one or more processors of a server device, cause the one or more processors to:
   receive an image of printed material from a user device over a network;
   transmit, over the network, a prompt to the user device to select a training aid to be generated from the image of the printed material, the training aid being selected from a group of available training aids;
   receive, over the network and from the user device, at least one edit to the image of the printed material, the at least one edit including a user edit to a text of the image of the printed material;
   generate the training aid from the image of the printed material based on a selection of the training aid and the at least one edit; and transmit, over the network, the training aid to the user device.

21. The non-transitory computer-readable medium of claim 20, where the one or more instructions that, when executed by the one or more processors, further cause the one or more processors to:
perform optical character recognition (OCR) on the image of the printed material; and where the one or more instructions, that cause the one or more processors to generate the training aid, cause the one or more processors to generate the training aid based on performing the OCR on the image of the printed material.

* * * * *